July 17, 1962 JOHN R. OISHEI ETAL 3,044,823
VEHICLE WINDOW CONTROL SYSTEM
Filed April 11, 1956 3 Sheets-Sheet 1

INVENTORS
JOHN R. OISHEI, and
HOBART V. ROBERTS JR.
BY
Bean Brooks Buckley & Bean
ATTORNEYS

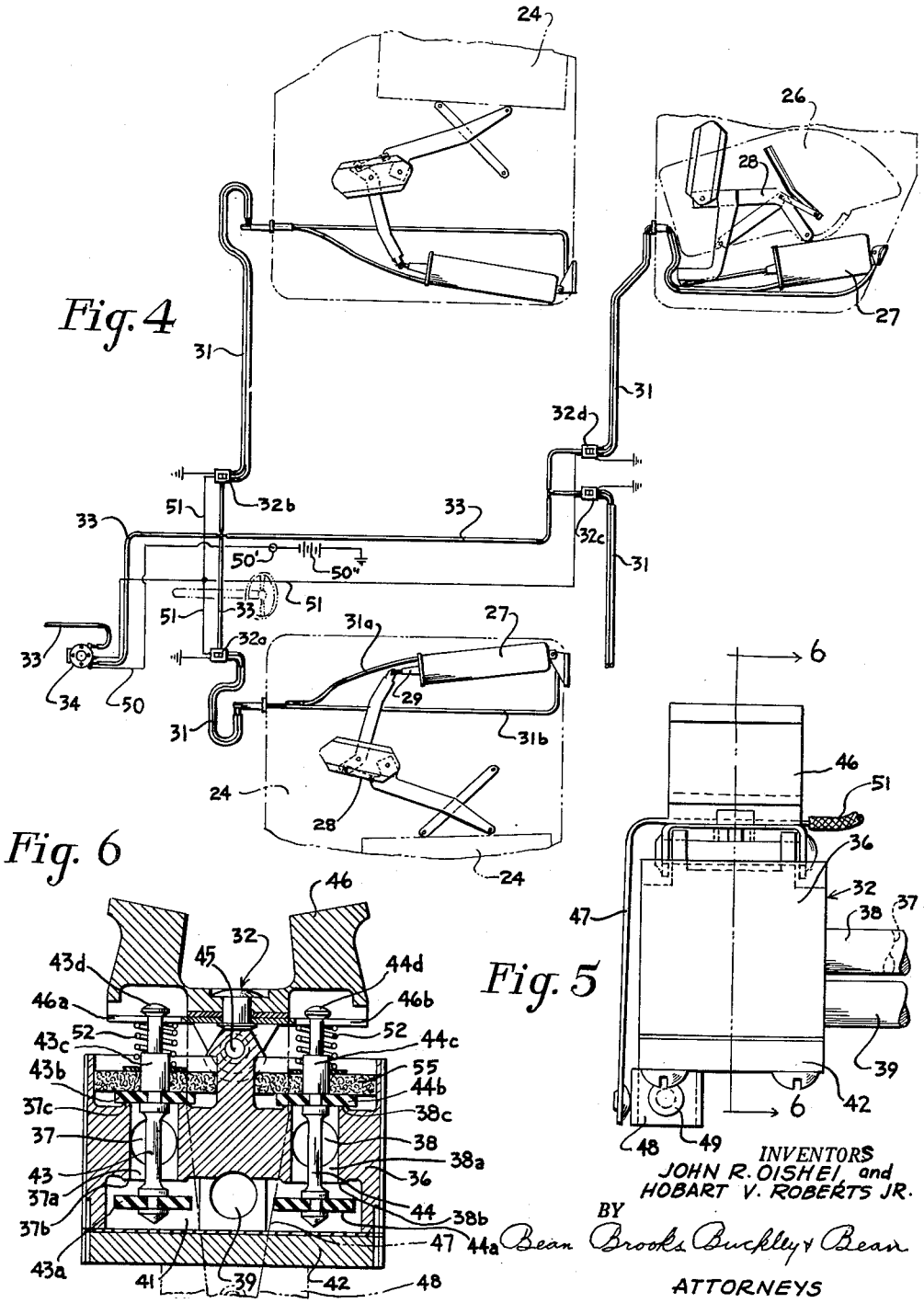

INVENTORS
JOHN R. OISHEI and
HOBART V. ROBERTS JR.
BY
Bean Brooks Buckley + Bean
ATTORNEYS

3,044,823
VEHICLE WINDOW CONTROL SYSTEM
John R. Oishei, Buffalo, and Hobart V. Roberts, Jr., Elma, N.Y.; said Roberts assignor to Trico Products Corporation, Buffalo, N.Y.
Filed Apr. 11, 1956, Ser. No. 577,478
3 Claims. (Cl. 296—44)

This invention relates to motor vehicles and primarily to the window systems therefor, the primary object being to provide a practical and economical window operator that will simplify its installation and bring within the reach of car buyers in all car price fields the power operation of windows with its much desired advantages and the ultimate discarding of the long endured hand crank mechanism, without introducing the hazards of operational failure present in the complicated power operated windows previously used.

A further object is to minimize the initial high cost as well as the installation and maintenance expense of power windows which up to now have forestalled broad acceptance by car builders and decelerated the public demand for the equipment. As an aid to driving safety, the virtue of touch-button action to control the opening and closing of car windows has been long recognized. With the elimination of the tedious hand cranking of windows up and down and the substitution of a practical power installation, much more frequent complete changes of the air in the confined low-ceiling passenger compartments of the modern car are encouraged by its ease of obtaining better ventilation. With the countrywide extension of turnpikes where long continuous stretches of miles of travel at fast speeds are negotiated without stops, it has been recorded that the major cause of casualties (up to ninety percent) is the result of sleepiness overcoming the driver. More frequent air changes in the passenger compartment to refresh and keep the motorist's senses alert is an important factor in safeguarding against driving fatigue.

Since the introduction of the first power windows, employing hydraulic power in one-way acting servo units that are now generally obsolete as a window power medium, no changes have been made in the styling of the required electrically operated and costly control mechanism. These have been continued as a two-fold drawback to progress by burdening the systems with both unnecessary first cost and added cost of installation, as well as continuing a highly multiplied operational failure hazard. To escape from the hazards of the early hydraulic systems, which were using up to 250 p.s.i. hydraulic pressure for window movement in one direction and an 80# spring for the return movement, car builders have swung over to individual electric motors placed in each window or door well. Here again, complications have followed as a result of the high powered electric conduits that were carried into the window wells and where, as in the hydraulics, relays have been needed to protect the controls against being fouled out by arcing of contact switches. Approximately forty percent of the cost involved in the heretofore considered fluid power system is involved in the electric contacts including a selective keyboard cluster-switch, such as used in the more costly hydraulic and electric motor systems. Minor use has been made of the pneumatic system which heretofore was made unnecessarily complicated by following along with the remote control electric contacting mechanism required in both the hydraulic and the electric systems.

It is a further object of this invention to depart completely from the orthodox styling of the electric control contacting mechanism by introducing a change of the control system for power window actuation. This is accomplished by routing the fluid air flow through twin-tube conduits, to provide a manual control entirely independent of the electrical system. In the instant control system, which is not limited to air fluid power, full advantage is taken of the unique structure of the valveless, dry fluid pressure reversible motors having two outlet passages which are alternately used as air inlets. Twin-tube conduits are carried up to the controls. The tubes are unitarily connected together and are used alternately as air inlets to the motor when the control is tripped over into either operating position through the manual actuator. With the starting up of the engine, the entire system of four power units and the conduits is evacuated. Operation by differential pressure is thereafter assured by simply admitting atmospheric pressure to one side of the motor as determined by the finger tripping of the manual actuator.

Another object of the instant invention is to provide an economical system build-up with a novel arrangement of window controls to afford greater accessibility to them and greater ease in effecting proper ventilation of the passenger compartment that induces more frequent ventilation. In modern car design there is a tendency to take advantage of the newly developed wraparound and rearwardly sloping windshield to give the drive better vision by placing the driver forwardly of the point of entrance into the car and/or centrally positioned in the driving compartment so as to afford the best vision from both side directions as well as ahead. In the forward and/or central position the car driver can not conveniently, if at all, reach controls positioned in the doors or beneath the side windows of the vehicle. According to this invention, the unique placement of the system of controls renders them accessible at a location centrally of the car, both front and rear, for plural operations of common controls by either driver or passengers with a better result in economy and dependability. In the earlier systems, the controls have been on the panels forming the window wells and each has been remotely placed from the other to limit operation of controls to a single person, either the driver or the immediately adjacent passenger. In the instant invention, through a repositioned and simplified control mechanism, the number of double-acting actuators is reduced to a practical extent. Thus the system has greater control versatility than the control systems heretofore offered.

Ample negative pressure is available, the intake manifold vacuum rising to as much as twenty-five inches when the engine is braking the car, or about seven inches above engine idling vacuum. The stripped down cost of the system is a minimum in comparison to earlier systems. The present system is of simplest construction and should last for the life of the motor car. It should be substantially free of the need of field service and at the same time be as safe against operational failure as the manually operated hand-crank it is intended to supplant. With the window power pistons manually activated and piped directly to the engine, the instant window operating system can be installed in the modern motor car and kept within the reach of car buyers in all care-price fields. With the new control placement avoiding duplication, comparative cost savings in electrically powered systems is made possible while at the same time lessening the hazard of failure by reducing the required number of switch contacts.

The several actuators in the window system are made mutually operable by all occupants of the vehicle since they are brought within their arm's reach. Consequently, it is unncessary for them to leave their normally seated positions adjacent their respective windows. The rear seat passengers have ready access to both rear window controls while the driver and the front seat passenger have access to the actuators from a sitting posture by simply resting an arm on the back of the seat. The placement of the controls affords greater utility and encourages more frequent air changes. The elimination of certain elements heretofore employed in known window control ssytems gives the present system inherent simplicity, with substantial savings in cost.

These and further objects and features of the invention will become more apparent from the following description and the accompanying drawings wherein:

FIG. 4 is a plan lay-out of a further modification of the control placements;

FIG. 5 is an end view of a control used in the system of the invention;

FIG. 6 is a section view as seen from line 6—6 in FIG. 5;

Figure 1:
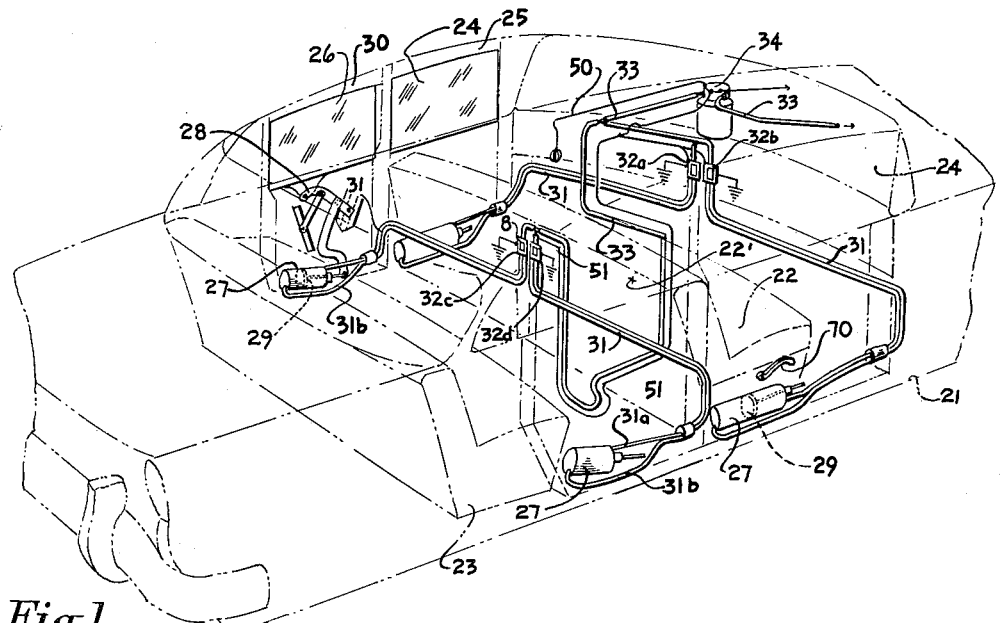
FIG. 1 is a schematic phantom view in perspective of a motor vehicle illustrating the improved system of window controls or actuators.

Referring now to the drawings and more particularly to FIGS. 1 and 4, numeral 21 identifies an automobile of the four-door type having front and rear seats 22 and 23, respectively, with front side windows 24, and rear side windows 26. The front side windows are slidably supported for up and down movement in the front doors 25, while the rear side windows 26 are supported for up and down movement in the rear doors 30. Each window has a power operated window moving unit, preferably in the form of a pneumatic motor including a cylinder 27, a piston 29 therein, and a linkage arrangement 28 interposed between the piston and the window for opening and closing the same. The piston may be of the self-locking type disclosed more fully in an earlier Patent No. 2,515,712.

A twin-tube conduit 31 connects each cylinder to a source of pressure, either negative or positive, one tube 31a of the conduit being connected to the front end of the cylinder and the other tube 31b to the rear end thereof. The twin-tube conduit facilitates the installation of the system since it provides a ribbon-like conduit to lie flat upon a supporting surface and also holds the companion tubes together in making their connections to the cylinder. Each twin-tube conduit 31 is connected to a control 32.

Figure 2:
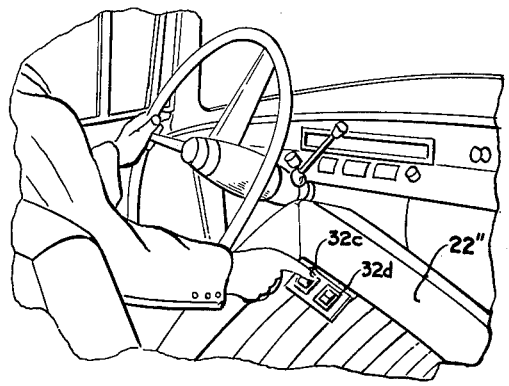
FIG. 2 is a fragmentary perspective view of a modified location of the controls for the rear windows.

According to the present invention, the several controls, or their actuators, have a novel placement or arrangement which affords utility and encouragement for frequent air changes in the passenger compartment of the vehicle. Controls 32a and 32b are arranged within easy reach of the occupants of the front seat and are mounted somewhat centrally in the vehicle and preferably on the instrument panel. Controls 32c and 32b are mounted in a centrally located group, preferably on the back 22' of the front seal 22. In the two door type of vehicle, in which the back of the front seat is made in two sections for folding so that easy access may be had to the rear seat, controls 32c and 32d may be mounted on the back of one folding portion 22" as more clearly illustrated in FIG. 2. In either embodiment, the actuators for the rear windows are placed approximately equidistant from the two passengers at the opposite ends of the rear seat. They are likewise equidistant from the driver and his front seat passenger. Ease of access to the actuators induces a more frequent changing of the air in the passenger compartment toward better ventilation.

It may be desirable to locate the control 32a to the left end of the steering column, as in FIG. 4. It may also be desirable, to place the group of controls in some other central location where they are accessible to the driver and the front seat passenger, as well as the rear seat passengers.

Figure 7:
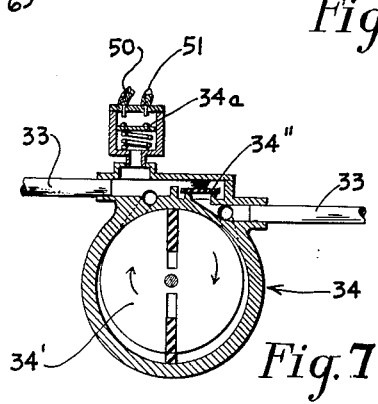
FIG. 7 is a schematic illustration of an auxiliary vacuum pump useable in the system of the invention.

Each of the controls 32 is in the form of a valve connected to a pressure supply hose 33 which is arranged for connection to a source of vacuum, such as the engine intake manifold, or an auxiliary vacuum source in the form of a motor driven pump 34 may be arranged in the conduit 33, the operation of said pump being initiated upon manipulation of one of the controls 32, and only when the manifold suction is insufficient for window use. This pump has a rotor 34' (FIG. 7), eccentrically journaled in the pump chamber, and also a bypass to permit the manifold to evacuate the window system in which state it is normally held by the bypass check valve 34". A pressure responsive switch 34a opens the pump motor circuit when the manifold suction is ample but closes the pump circuit when supplemental pressure is required for accessory operation. A pump of this character is shown in another patent No. 2,520,650. By this arrangement, the cylinders of the several window power units are interconnected by the twin-tube conduits so that should the vehicle engine be arrested when window adjustment is desired, the unselected ones of the interconnected cylinders will combine to serve as a reservoir for the selected unit to carry through its window actuating cycle. When a pump is not employed in the system, a similar functioning check valve 34" will be inserted in a suitable location to trap the manifold suction influence in the system to maintain it normally under vacuum by evacuating all of the cylinders 27.

Each control 32 for the pneumatic window units may be of any suitable valve construction, such as is illustrated in FIGS. 5 and 6, wherein a body 36 is formed with three nipples 37, 38 and 39 for attachment of the tubes 31a, 31b and the pressure supply conduit 33. Nipple 39 opens into a suction or pressure chamber 41, and nipples 37 and 38 open into passages 37a and 38a, respectively. These passages extend through the control body 36 and open at one end through suction valve seats 37b and 38b into the suction chamber 41 and at the opposite end through atmospheric valve seats 37c and 38c. Valve units 43 and 44 have, respectively, valving discs 43a and 44a engageable with seats 37b and 38b and valving discs 43b and 44b engageable with the atmospheric valve seats 37c and 38c. The valving discs 43a and 43b are held spaced apart by a stem 43c, and likewise the valving disc 44a and 44b are held spaced apart by a stem 44c so that only one valving disc of each unit will function at a time. The valve stems project upwardly and are connected to an actuator 46 which is rockably mounted on pivot 45. A pair of springs 52 under the opposite ends of the actuator serve to return it to a normal or neutral position and to yieldably seat the atmospheric valves 43b and 44b and to unseat the suction valves 43a and 44a whereby the suction chamber 41 is normally in communication through the nipples 37 and 38 with the opposite ends of the cylinders 27 to hold their respective pistons 29 in vacuum suspension. The upper ends of the valve stems are engaged in slots 46a and 46b and are retained against axial displacement from the slots by heads 43d and 44d which are held down on the upper margins of the slots by the springs 52. This provides a play connection, which upon rocking the actuator in one direction will lift on one stem and play or idly move downwardly on the companion stem against the urge of the adjacent spring 52.

The action of this control is such that upon rocking the actuator clockwise, FIG. 6, the left hand valve unit will lift its valving disc 43a to its seat 37b to interrupt the suction communication and to unseat its valving disc 43b from the atmospheric seat 37c to open the atmospheric communication to the selected cylinder 27 to unbalance the vacuum suspended piston 29 for energizing the window unit. During this rocking action the right hand valve unit 44 will remain in its normal position as the actuator idles along the valve stem 44c against the urge of the adjacent spring 52. Upon the release of the hand pressure on the actuator the right hand spring 52 will serve to restore the actuator to its normal position in which the piston 29 will again be placed under vacuum suspension. A filter pad 55 may be carried by each valve stem for purifying the air before entering the cylinder.

Rocking the actuator counterclockwise will correspondingly act to lift the right hand valve unit 44 while the left hand unit 43 remains quiescent, for effecting movement of the window in the opposite direction. The bottom plate 42 is removable to give access to the vacuum chamber 41.

Where the installation includes the auxiliary source of pressure, the circuit for the pump 34 will include a contact arm 47 fixed at one end to the actuator 46 and arranged for wiping engagement with contact plate 48 mounted upon the plate 42. Connected to the contact plate 48 is a terminal connector 49 forming the end of a circuit wire 51 leading from the controls to the motor driven pump 34. A second wire 50 connects the pump 34 through the vehicle ignition switch 50′ to the battery 50″. Whenever the actuator is rocked from its normal position, the switch 47, 48 will close. The pump circuit will be established simultaneously with the movement of either valve unit 43 or 44, subject to the pressure responsive switch 34a. This will assure adequate vacuum in the conduit 31a or 31b for opening or closing a window when the engine is shut off.

The operation of the system of the invention as above described is as follows. Assume that the vehicle operator wishes to close the right side rear window of the vehicle, he merely reaches over the back of the front seat section and depresses the corresponding actuator 46. This actuator is equally accessible to the other occupants of both the front and rear seats. As a result of rocking the actuator, the switch contacts 47 and 48 are brought together to energize the pump 34, providing the manifold suction is low enough to permit the pressure responsive switch 34″ to close. Simultaneously, fluid connection will be made between conduit 31b and atmosphere to thus establish a pressure differential on the piston 29 resulting in the movement thereof, which movement is transmitted via the linkage 28, to cause movement of the window. It will be readily seen that opposite movement of the lever 46 from its normal position will connect conduit 31a to atmosphere, resulting in an opposite pressure differential on the piston 29 to cause movement thereof in the opposite direction, which movement will be transmitted by the linkage 28 for reverse movement of the vehicle window.

Figure 3:
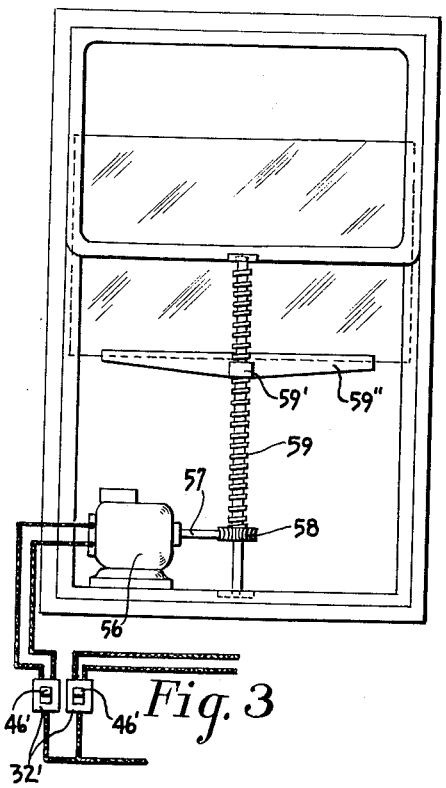
FIG. 3 is an illustration of an electrically operated vehicle window.

The control illustrated has been especially designed for a suction actuated window system, but it is apparent that the ease of accessibility provided by the present invention is applicable to other types of window systems, such as one operated by compressed air, or by hydraulic pressure, or, as is shown in FIG. 3, an electrically operated window system wherein the controls 32′ are in the form of electric switches and have their actuators 46′ grouped in the manner above set forth, and especially with respect to the placement of the actuators for the rear windows in a centrally located position to be reachable with equal facility by the driver and the occupants of the rear seat. The electrical window unit may be of improved form to include an electric motor 56 having its drive shaft 57 connected by a worm gearing 58 to the screw shaft 59, the latter cooperating with a nut 59′ on the window frame member 59″.

From the foregoing it will be observed that the several windows are within each reach of the driver of the vehicle; that the number of the actuators is held to a minimum; and the use of a master switch with its multiple and involved connections is avoided. The use of such master switch in the vehicle window controls of the prior art often required eight conduits on the keyboard control positioned for use by the vehicle operator, and six additional conduits for the individual window controls mounted on the panels of the window wells. With the simplified control system of the invention as above described, only one main conduit 33, and four twin-tube conduits 31 are required, thus reducing the number of power transmission lines between the window controls and the window wells from eighteen to six. Significant installation time saving is achieved and the element of hazards of failure through a break in the connections is reduced.

Figure 9:
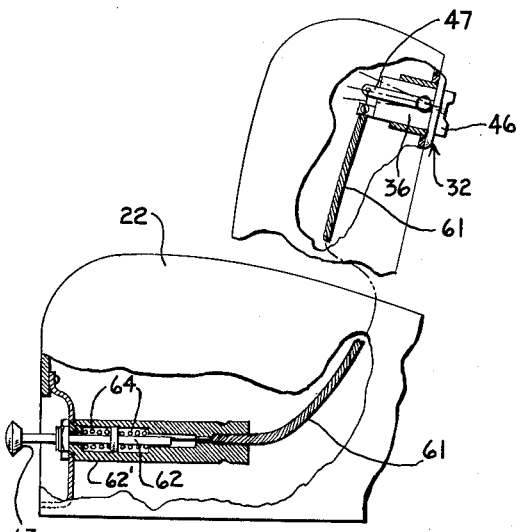
FIG. 9 is a fragmentary view illustarting a further arrangement of the invention.
Figure 11:
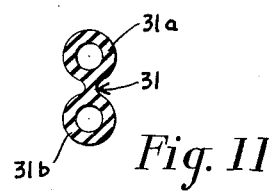
FIG. 11 is a cross section view through a twin-tube conduit used in the system of the invention.

If desired, the controls 32 with their actuators 46, in addition to being placed on the back of the front seat, may have mechanical extensions to the front edge of the front seat within reach of the driver's right hand. FIG. 9 illustrates such an arrangement which may be more convenient for some drivers and front seat passengers by which to regulate the rear windows. Herein, the pair of rear window controls 32 are mounted on the back of the front seat, in the manner above described, and to the control switch arm 47 of each control is attached a Bowden wire 61 that has its other end connected to a push-pull actuator slide 62 positioned in the forward edge of the front seat. The slide 62 is mounted within a supporting tube 62′ and carries on its projecting end a knob 63 at the front of the seat. A pair of springs 64 are arranged in opposition within the supporting tube 62′ and serve to maintain the slide and actuator in a neutral position when the control member is not being used. By pushing the knob 63 inwardly the actuator 46 will be rocked clockwise, and by pulling on the knob the actuator will be rocked counterclockwise. It will therefore be seen that by means of this mechanical extension of the actuator 46, the selected rear window may be opened or closed by the driver from his arm in a lowered position.

Figure 8:
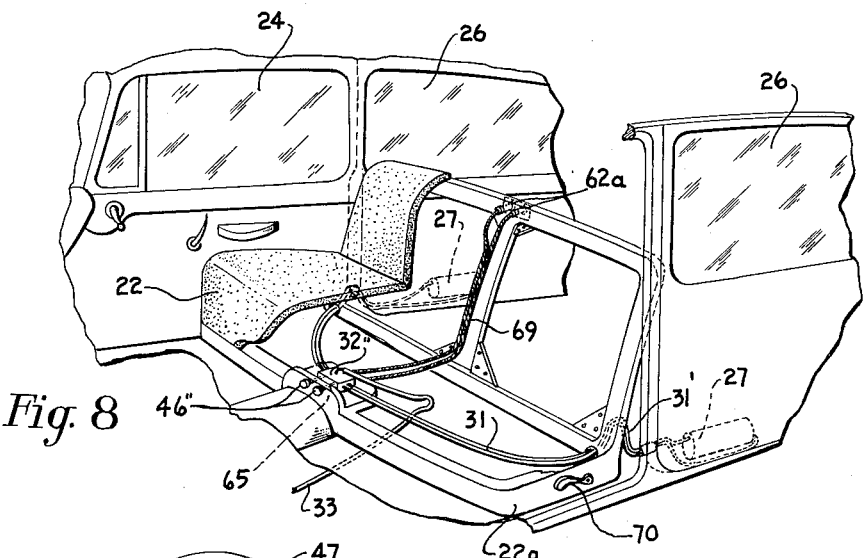
FIG. 8 is a fragmentary perspective view illustrating a further modification in the system of the invention.
Figure 10:
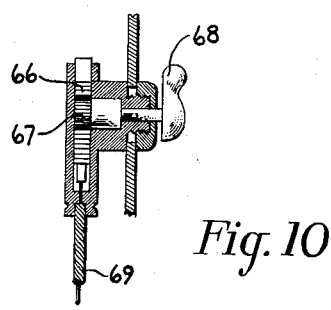
FIG. 10 is a section view illustrating a modified type of control.

A further simplication of the details of the actuator element is shown in FIG. 8 wherein the control 32″ is removed from the back of the front seat and is lowered onto the seat frame 22a, thereby shortening the hose and tube connections. The controls 32″ are of similar construction as that previously described, the same having push buttons 46″ at the front side of the seat and fixed upon slidably mounted rods 65 that extend inwardly into the rockable actuator to which the valve units 43 and 44 are connected. This arrangement necessitates a mechanical extension from the rockable actuator over onto the back of the front seat by means of Bowden cables 69 within easy reach of the rear seat passengers. The rear terminals of the cables may be in the form of depressible buttons 62a, or they may be provided with rack bars 66 (FIG. 10) having meshing pinions 67 that are rocked by swinging the handles 68 to the right or left. The front seat 22 may be adjusted forwardly or backwardly by a handle 70, and to accommodate this sliding adjustment of the seat, the twin-tube conduits will be provided with loops 31′, FIG. 8.

From the foregoing it will be seen that the principles of the invention can be applied in various ways to provide great flexibility in the manner of achieving the stated objectives of the invention.

The foregoing description has been given in detail for clearness and without thought of limitation since the inventive principles involved are capable of assuming other physical embodiments without departing from the spirit of the invention and the scope of the appended claims.

What is claimed is:

1. A power actuated window mechanism for a vehicle having front and rear cross seats with two front and two rear windows associated therewith, comprising a system of controls, one control for each window and all four of said controls being positioned within normal arm's reach of the driver when seated at one side of the front seat, the two rear window controls likewise being positioned within normal arm's reach of at least two passengers in sitting posture when one such passenger is seated at the other side of the front seat and the other such passenger is seated at one side of the rear seat, whereby either such passenger can conveniently adjust the position of at least two out of the four windows without leaving a normal seated posture.

2. In a system of controls for four power actuated car body windows in a vehicle having front and rear seat sections, a total of four controls, one for each window, all of said controls being positioned within normal arm's reach of the driver when seated at one side of the front seat section, two of said controls likewise being within normal arm's reach of at least two passengers in sitting posture, one on the other side of the front seat section and one on one side of the rear seat section, and three of said controls being within normal arm's reach of one of said passengers, whereby either passenger may adjust the position of at least two out of the four windows and said one of said passengers may adjust three out of the four windows all without leaving a normal seated posture.

3. In a vehicle having front and rear side windows with fluid operated power units therefor, control means for said units to adjust said power operated windows, said control means including manually operable actuators arranged for the individual control of the respective power operated window, the two of said actuators for controlling said front side windows being arranged generally centrally on the vehicle instrument panel within arm's reach of the front seat occupants, and the two of said actuators associated with said rear side windows being arranged on the back of the front seat within arm's reach of the rear seat occupants as well as the front seat occupants.

References Cited in the file of this patent
UNITED STATES PATENTS

| | | |
|---|---|---|
| 2,366,790 | Horton | Jan. 9, 1945 |
| 2,425,391 | Parsons | Aug. 12, 1947 |
| 2,786,921 | List | Mar. 26, 1957 |
| 2,795,455 | Earl | June 11, 1957 |

UNITED STATES PATENT OFFICE
CERTIFICATE OF CORRECTION

Patent No. 3,044,823　　　　　　　　　　　　　　　July 17, 1962

John R. Oishei et al.

It is hereby certified that error appears in the above numbered patent requiring correction and that the said Letters Patent should read as corrected below.

Column 3, line 4, for "ssytems" read -- sytems --; line 64, for "32b" read -- 32d --; line 66, for "seal" read -- seat --.

Signed and sealed this 6th day of November 1962.

(SEAL)
Attest:

ERNEST W. SWIDER
Attesting Officer

DAVID L. LADD
Commissioner of Patents